United States Patent
Jørgensen (10) Patent No.: US 11,384,820 B2
(45) Date of Patent: Jul. 12, 2022

(54) LINEAR ACTUATOR

(71) Applicant: LINAK A/S, Nordborg (DK)

(72) Inventor: Rolf Jørgensen, Middelfart (DK)

(73) Assignee: Linak A/S, Aalborg (DK)

( * ) Notice: Subject to any disclaimer, the term of this patent is extended or adjusted under 35 U.S.C. 154(b) by 0 days.

(21) Appl. No.: 16/960,477

(22) PCT Filed: Jan. 11, 2019

(86) PCT No.: PCT/DK2019/000011
§ 371 (c)(1),
(2) Date: Jul. 7, 2020

(87) PCT Pub. No.: WO2019/137588
PCT Pub. Date: Jul. 18, 2019

(65) Prior Publication Data
US 2020/0340559 A1 Oct. 29, 2020

(30) Foreign Application Priority Data

Jan. 11, 2018 (DK) .......................... PA 2018 00015

(51) Int. Cl.
*F16H 25/20* (2006.01)
*F16H 25/24* (2006.01)
(Continued)

(52) U.S. Cl.
CPC ............ *F16H 25/20* (2013.01); *F16H 25/24* (2013.01); *H02K 5/225* (2013.01); *H02K 7/06* (2013.01);
(Continued)

(58) Field of Classification Search
CPC ...... F16H 25/20; F16H 25/24; F16H 25/2418; F16H 2025/2075; F16H 2025/2087; H02K 5/225; H02K 7/06; H02K 7/116
See application file for complete search history.

(56) References Cited

U.S. PATENT DOCUMENTS 5,901,610 A * 5/1999 Schneider ................. F16H 1/08
74/421 A
8,358,096 B2 * 1/2013 Bastholm ............ F16H 25/2015
318/626
(Continued)

FOREIGN PATENT DOCUMENTS

DE        9404383.3 U1    5/1994
DE        29514871 U1 * 11/1995  ............... F16H 1/46
(Continued)

*Primary Examiner* — Zakaria Elahmadi
(74) *Attorney, Agent, or Firm* — Dykema Gossett PLLC (57) ABSTRACT

Linear actuator comprising a housing (1) consisting of two parts (1*a*, 1*b*), an electric motor (3) with a motor shaft, a transmission (8-11) in connection with the motor shaft, a spindle unit in connection with the transmission, where the spindle unit comprises at least a spindle (7) with a spindle nut (14) and where the spindle (7) is equipped with a bearing (12), an adjustment element (13) in connection with the spindle unit. The linear actuator is characterized in that a mounting unit (2) is embedded in the housing, said mounting unit (2) has a front and a rear end, and where the motor (3) is placed on the rear end of the mounting unit (2) and the spindle (7) is mounted on the front end of the mounting unit (2), and where the transmission (8-11) is located inside the mounting unit (2). In addition to being able to reduce the number of components with this construction, e.g. the activation element (13), the front mounting (15) and the spindle nut (14) can be moulded as one single plastic unit, it also allows for a slackening of the tolerances as the assembly of the components is considerably simplified, namely only with regard to the mounting unit (2). In that connection, the transmission (8-11) is expediently placed in the mounting unit (2).

16 Claims, 8 Drawing Sheets

(51) Int. Cl.
*H02K 5/22* (2006.01)
*H02K 7/06* (2006.01)
*H02K 7/116* (2006.01)

(52) U.S. Cl.
CPC .......... *H02K 7/116* (2013.01); *F16H 25/2418* (2013.01); *F16H 2025/2031* (2013.01); *F16H 2025/2075* (2013.01); *F16H 2025/2087* (2013.01)

(56) References Cited

U.S. PATENT DOCUMENTS

| | | | | |
|---|---|---|---|---|
| 2006/0270330 A1* | 11/2006 | Schmid | ................... | F16C 31/02 |
| | | | | 452/58 |
| 2009/0016834 A1* | 1/2009 | Scrimshaw | ............. | B25F 5/001 |
| | | | | 408/139 |
| 2010/0282008 A1* | 11/2010 | Knudsen | ............. | G01D 5/2515 |
| | | | | 74/89.23 |
| 2010/0283421 A1* | 11/2010 | Knudsen | ............. | F16H 25/2021 |
| | | | | 318/468 |
| 2015/0047443 A1* | 2/2015 | Tseng | ...................... | F16H 25/20 |
| | | | | 74/89.23 |
| 2017/0271947 A1* | 9/2017 | Ando | ...................... | F16D 55/36 |
| 2019/0009693 A1* | 1/2019 | Angerer | ................. | B60N 2/929 |
| 2019/0264789 A1* | 8/2019 | Shimizu | ................. | H02K 7/116 |
| 2020/0052550 A1* | 2/2020 | Shimizu | ................... | H02K 7/06 |

FOREIGN PATENT DOCUMENTS

| | | |
|---|---|---|
| DE | 29514871 U1 | 11/1995 |
| EP | 0586326 A1 | 9/1992 |
| EP | 0531247 A1 | 3/1993 |
| EP | 0647799 A2 | 7/1995 |
| EP | 0662573 A1 | 7/1995 |
| EP | 0831250 A2 | 3/1998 |
| WO | 1998/030816 | 7/1998 |
| WO | 2016/015730 A2 | 2/2016 |

* cited by examiner

LINEAR ACTUATOR

CROSS-REFERENCE TO RELATED APPLICATIONS

This application is a national stage filing based upon international application no. PCT/DK2019/000011, filed 11 Jan. 2019 (the '011 application), and published in English on 18 Jul. 2019 under international publication no. WO 2019/137588 A1, which claims priority to Denmark (DK) patent application no. PA 2018 00015, filed 11 Jan. 2018 (the '015 application). The '011 application and the '015 application are both hereby incorporated by reference as though fully set forth herein.

The present invention relates to a linear actuator comprising a housing consisting of at least two parts, an electric motor with a motor shaft, a transmission in connection with the motor shaft, a spindle unit in connection with the transmission, where the spindle unit comprises at least one spindle with a spindle nut, and where the spindle is equipped with a bearing, an adjustment element in connection with the spindle unit.

This type of actuator is e.g. known from EP 531 247 A1, EP 586 326 A1, EP 647 799 and EP 662 573 A1, all to Linak A/S, with a plastic housing consisting of two half-shells, where the individual components are mounted in one half-shell, which, when the mounting is completed, is closed by means of the other half-shell. From WO 98/30816 to Linak A/S is known an example of a sophisticated actuator with a very high performance achieved by a metal chassis. For these actuators applies that they comprise an outer tube, which surrounds the activation element, which typically is tubular and where the outer tube is fixedly mounted in the housing.

A designless heavy-duty actuator without housing for industrial purposes is based on a carrying metal housing with integrated rear mounting where the forces are transferred through this. A somewhat comparable actuator is known from DE 94 04 383.3 U1 to Dewert Antriebs- und Systemtechnik, where the housing, which is made from pressure cast zinc, is constructed with a cylindrical part in which the motor is located, which is closable by means of a cover. The pressure cast zinc housing is relatively large as it should accommodate the motor, which renders the solution relatively expensive.

From EP 0 831 250 A2 to Dana Corporation an actuator with a housing having a somewhat different construction is known. The housing comprises a shell which surrounds the motor and transmission. The shell, which is open towards the rear, i.e. towards the rear mounting of the actuator, is closed by means of a cover. Towards the front, i.e. towards the spindle, the shell is provided with a mounting for the outer tube, which serves a guide for the spindle nut and as guide for the outer end of the spindle. The transversal loads, which nevertheless occur on the spindle, are transferred through the outer tube to the housing. It is however also stated that the housing and the outer tube is made from a rigid material and as examples are mentioned among others aluminium, zinc alloys and stainless steel, i.e. the mentioned plastic materials nylon containing fibreglass, polyvinyl chloride and polythene have a rigidity corresponding thereto. All together a relatively expensive solution.

The purpose of the invention is to provide an actuator as stated in the preamble, which is simple and inexpensive to manufacture.

This is achieved according to the invention by equipping the linear actuator with a mounting unit embedded in the housing, said mounting unit has a front end and a rear end, and having the motor located at the rear end of the mounting unit and the spindle mounted on the front end of the mounting unit. In addition to thus being able to reduce the number of components, it allows for a slackening of the tolerances as the assembly of the components is considerably simplified, namely only with regard to the mounting unit. In that connection, the transmission is expediently placed in the mounting unit.

In a special embodiment, the housing consists of a front half and a rear half with a joining surface perpendicular to the longitudinal axis of the actuator. The two halves appear as two "cups" into which the individual components can be placed. The assembly of the two halves is also relatively simple, as they should simply be assembled with a cross-section perpendicular to the longitudinal axis, which also renders dirt and water proofing relatively simple. This is contrary to the known linear actuators, where the housing typically consists of two half-shells in a plane given by the longitudinal axis of the spindle.

In an embodiment, the housing has a recess for embedment of the mounting unit. The shape of the recess can be adapted to the outer side of the mounting unit and thus prevent this from being displaced in the longitudinal direction of the housing or possibly rotate about its longitudinal axis.

For additional fixation of the mounting unit, at least one side thereof can be equipped with a recess fitting over a rib in the housing. The recess is expediently constructed as an indentation, i.e. led out to an end of the mounting unit, allowing this to simply be pushed axially into the housing. In tensioned state, the mounting unit will, with its front end, abut upon the frontmost edge of the recess in the housing. The edge can be round-going or merely have two diametrically located sides, e.g. bottom and top.

In an embodiment, the electric motor is mounted against the rear end of the mounting unit, i.e. such that the front end of the electric motor rests against the rear wall of the mounting unit. For this purpose, the mounting unit is equipped with a number, at least two, of axially protruding pins fitting into corresponding holes in the front end of the motor. The motor is thus fixed against rotation relative to the mounting unit and both are fixed in the axial direction as the motor and the mounting unit abuts upon each other.

In that respect, for the axial fixation, an embedment, a seat for the rear end of the electric motor, is constructed in the rear end of the rear half of the housing. The embedment has a shape which is adapted to the shape of the rear end of the electric motor having a cylindrical protrusion for the motor shaft. In the bearing seat for the motor there is a corresponding cylindrical recess for receiving the protrusion on the rear end of the motor. When assembled, the motor is thus retained in the axial direction between the rear end of the mounting unit and the embedment inside the rear half of the housing. When the linear actuator is assembled, the motor is simply placed into the rear half of the housing and the mounting unit is placed on the front end of the motor, such that the pins reach into the holes on the motor.

The transmission is expediently constituted by a planetary gear, which is placed inside the mounting unit. In a specific embodiment, the sun wheel of the planetary gear is mounted onto the front end of the shaft of the electric motor, while the ring wheel is mounted on the rear end, the shaft of the spindle, while the remaining toothed wheels, such as planetary wheels, are mounted in the recess of the mounting unit.

On the rear end, the shaft of the spindle, a ball bearing for mounting on the spindle in the actuator is mounted. This ball bearing is expediently mounted in a recess intended for that purpose in the front side of the mounting unit, i.e. in front of the planetary gear. The assembly of the transmission thus becomes relatively simple.

The outer end, the free end of the spindle, is equipped with an activation element expediently in the shape of a length of tube. The end of the activation element, which is positioned over the spindle, is internally equipped with threads, which constitute the spindle nut for engagement with the external threads of the spindle. The outer end, the free end of the activation element, is equipped with a front mounting for mounting of the actuator. It is noted that the activation element does not necessarily have to be a tube, it can also be longitudinal ribs alternatively a single rod, which on its rear end terminates in a length of tube constituting the spindle nut and, in the front, terminates in the front mounting.

The rear end of the activation element can be equipped with a collar, which functions as stop against the front end of the mounting unit or the ball bearing in the fully retracted position of the activation element. When the actuator is mounted with the front mounting, the activation element and thus also the spindle nut is prevented from rotating, and when the spindle is rotated the activation element will thus move outwards or inwards on the spindle depending on its direction of rotation. Alternatively, the activation element can be secured against rotation in that the collar with incisions in the circumference gripping around axially running ribs inside the housing intended for that purpose. The latter can simplify the mounting of the actuator as the activation element can be displaced back and forth during the mounting process.

In an embodiment, the activation element with internal threads (spindle nut), collar and front mounting is moulded in plastic as one single unit. This obviously eases the mounting as only one element should be mounted, which is simply screwed only the spindle.

The activation element protrudes out through a hole in the front end of the housing, where the hole is constructed as a guide for the activation element, just as the hole can be equipped with a sealing, which prevents dirt and liquid from the outside from entering into the actuator.

The front mounting and the rear mounting can be an eye or a fork mounting. In both cases there is a transverse hole for a pin, bolt, shaft, locking ring or the like for fixation of the front mounting in the structure in which the actuator is mounted.

In an embodiment, the rear mounting is in the form of a fork mounting constructed as an integrated part of the rear half of the housing as the side walls as two flanges are guided past the end wall in the housing, and in the two elongated side walls there is a transverse hole for a pin, bolt, shaft, locking ring or the like for fixation of the rear mounting.

In an embodiment, the rear mounting is equipped with a special bracket for securing the actuator on a rib. The bracket is triangular with two side walls, on which there are axle pins for securing the bracket. When the bracket is inserted in the fork mounting, the two axle pins will enter into engagement with the through-going hole therein. In the bracket there is a longitudinal groove by means of which this can be led over the rib. The end of the bracket is equipped with a snap lock with a brace-shaped handle. When operating, pressing the handle, the bracket, and thus the actuator, is released from the mounting rib on the structure in which the actuator is mounted.

In the housing under the motor, a printed circuit board for the motor is inserted. The cable for the printed circuit board extends through a hole in the rear wall of the housing.

The invention will be explained more fully below with reference to the embodiments and variants of the linear actuator according to the invention shown in the accompanying drawing. In the drawing.

The linear actuator shown in the drawing comprises a housing 1 consisting of a front half 1*a* and a rear half 1*b*. In the housing 1, a mounting unit 2 is embedded in a recess. The shape of the recess is adapted to the outer side of the mounting unit 2 and thus prevents this from being displaced in the longitudinal direction of the housing 1 or possibly rotate about its longitudinal axis. For additional fixation of the mounting unit 2, one side thereof is equipped with a recess fitting over a rib in the rear half 1*b* of the housing 1. In tensioned and compressed state, the mounting unit 2 will with its front end abut upon the frontmost round-going edge of the recess in the housing 1, alternatively the rearmost round-going edge, and thus transfer the forces to the housing.

The rear end of the mounting unit 2 is equipped with an electric motor 3. For this purpose, that mounting unit is equipped with two axially protruding pins 4 fitting into corresponding holes in the front end of the motor. An embedment 5 for the rear end 3*a* of the electric motor is provided inside the rear end of the rear half 1*b* of the housing. The embedment 5 has a shape, which is adapted to the shape of the rear end 3*a* of the electric motor having a cylindrical protrusion 3*b* for a bearing the motor shaft. In the embedment 5, there is a corresponding cylindrical recess 5*a* for receiving the protrusion 3*b* on the rear end 3*a* of the motor. When assembled, the motor 3 is thus retained in the axial direction between the rear end of the mounting unit 2 and the embedment 5 inside the rear half 1*b* of the housing 1. The electric motor 3 is prevented from rotating by the engagement with the two pins 4 on the mounting unit 2.

The electric motor 3 drives a spindle 7 through a two-step planetary gear 6. The planetary gear 6 comprises a sun wheel 8, which is secured to the front end of the shaft of the motor 3. In the front end of the mounting unit 2, there is a recess 2*a* for the planetary gear. The rear wall of the recess is equipped with two opposite toothed wheel sets 9 in engagement with the sun wheel 8. Moulded as one with each toothed wheel 9 is a planetary wheel 10 in engagement with a ring wheel 11 mounted on the rear end, the shaft of the spindle 7. On the rear end of the spindle 7, in front of the ring wheel 11, a ball bearing 12 is provided. This ball bearing 12 is mounted in a recess 2*b* for that purpose in the front side of the mounting unit 2, i.e. on the opposite end of the mounting unit 2 than the recess for the planetary gear 6.

The outer end, the free end of the spindle 7, is equipped with an activation element 13 in the shape of a length of tube. The end of the activation element 13, which is positioned over the spindle 7, is internally provided with threads 14, which constitute the spindle nut for engagement with the external threads of the spindle 7. The outer end, the free end of the activation element 13, is equipped with a front mounting 15 for mounting of the actuator. The rear end of the activation element 13 is equipped with a collar 16, which functions as stop against the ball bearing 12 in the fully retracted position of the activation element 13. When the actuator is mounted with the front mounting 15, the activation element 13 and thus also the spindle nut is prevented from rotating, and when the spindle 7 is rotated, the activation element 13 will thus move outwards or inwards on the spindle 7 depending on its direction of rotation. Alternatively, the activation element 13 can be secured against rotation in that the collar 16 with incisions 16a in the circumference grips around axially running ribs inside the housing 1 intended for that purpose. The activation element 13 with internal threads (spindle nut), collar 16 and front mounting 15 is moulded in plastic as one single unit. The activation element 13 protrudes out through a hole 17 in the front end of the housing 1, where the hole 17 is constructed as a guide for the activation element 13, just as the hole 17 can be equipped with a sealing for preventing dirt and liquid from the outside from entering into the actuator.

Figure 1:
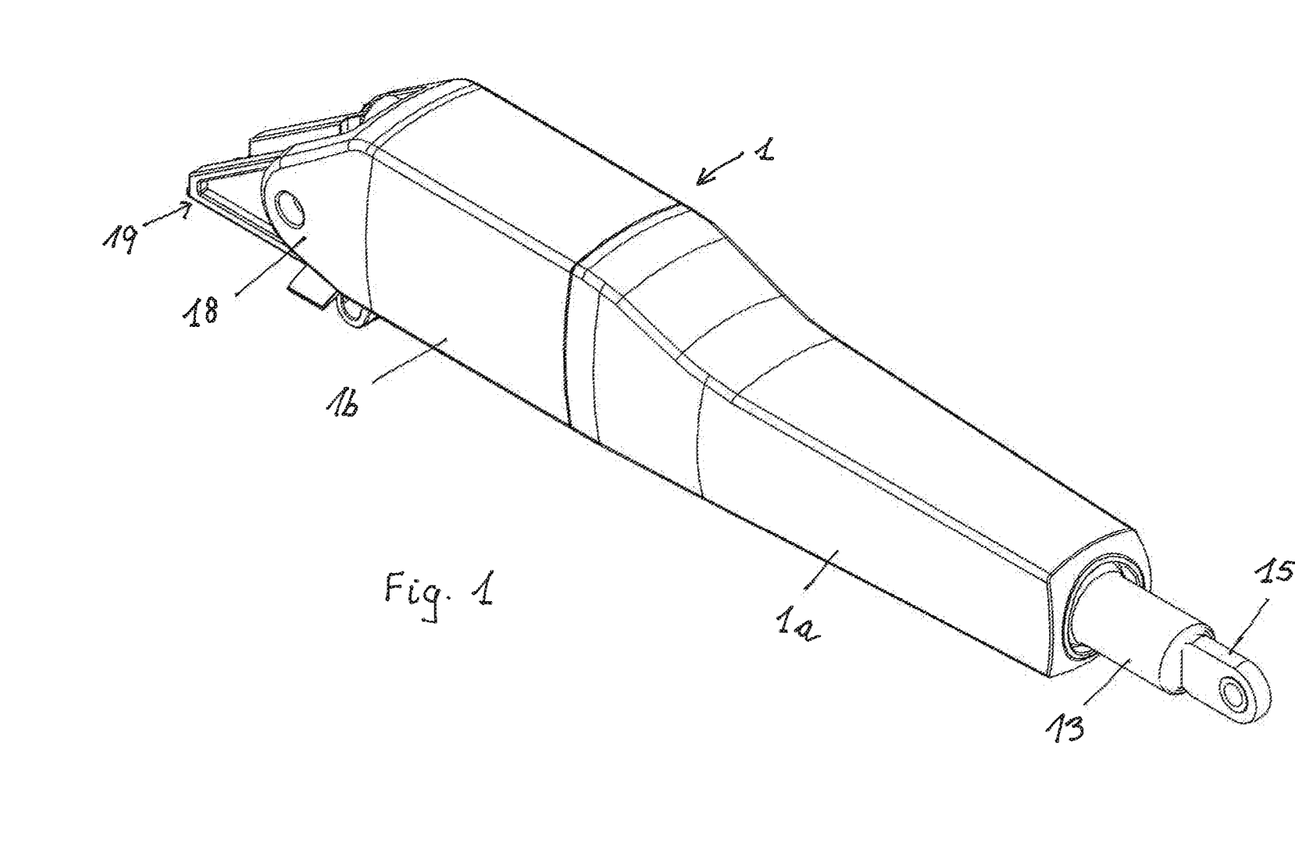
FIG. 1 shows a perspective view of a linear actuator seen from the front and shown with a bracket in the rear mounting.
Figure 2:
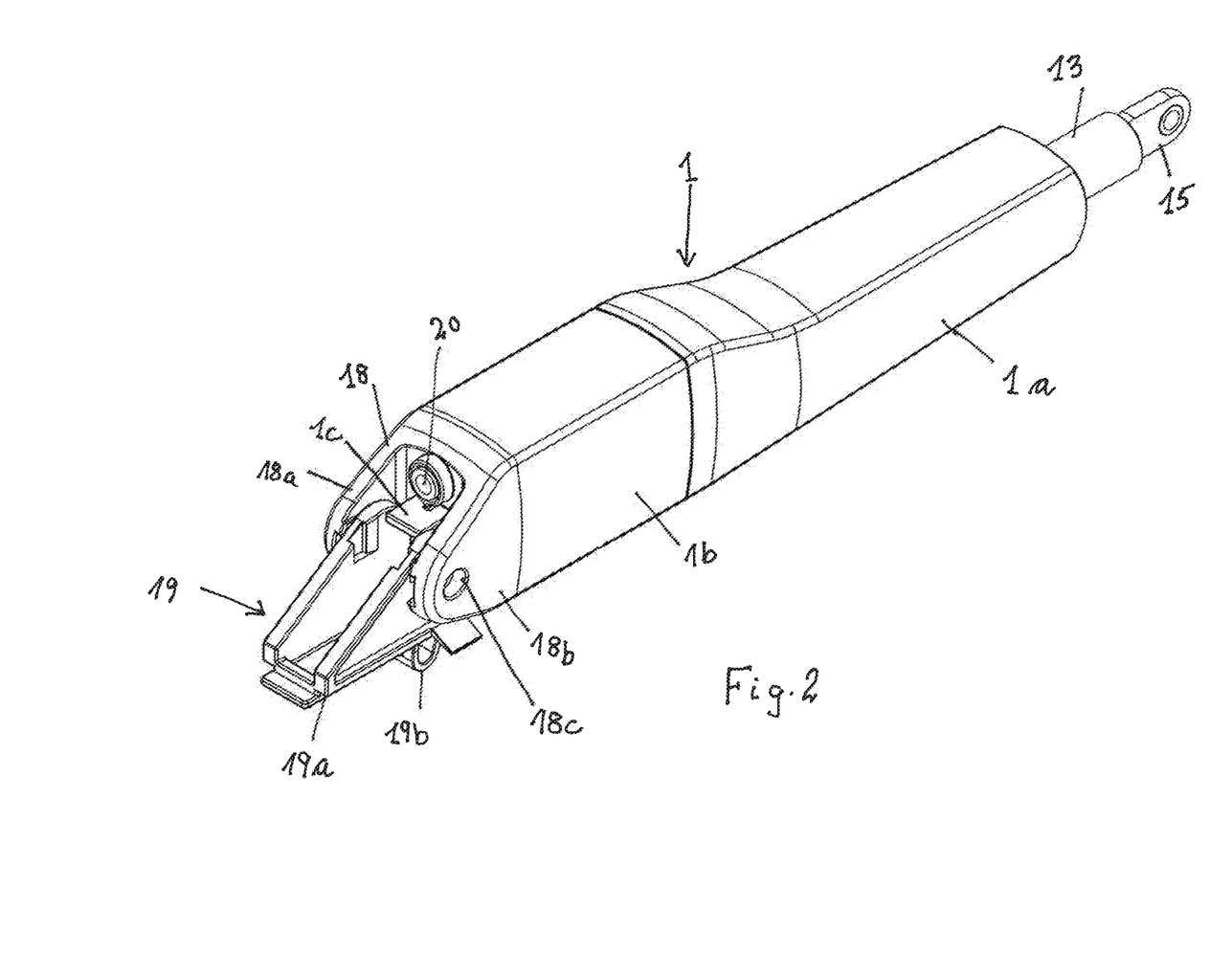
FIG. 2 shows a perspective view of the linear actuator of FIG. 1 seen from the rear.
Figure 3:
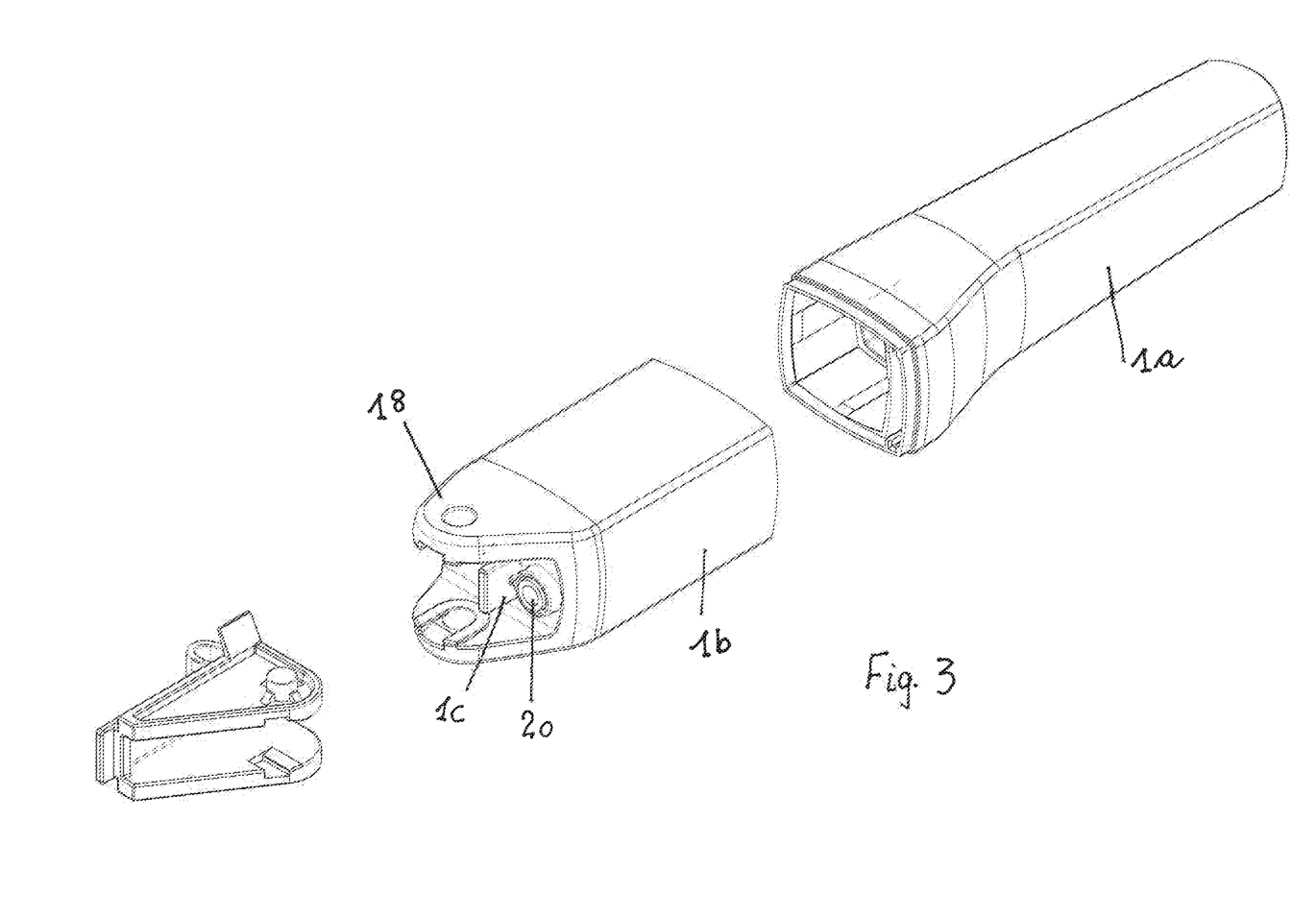
FIG. 3 shows an exploded view of the housing of the linear actuator of FIG. 1.
Figure 4:
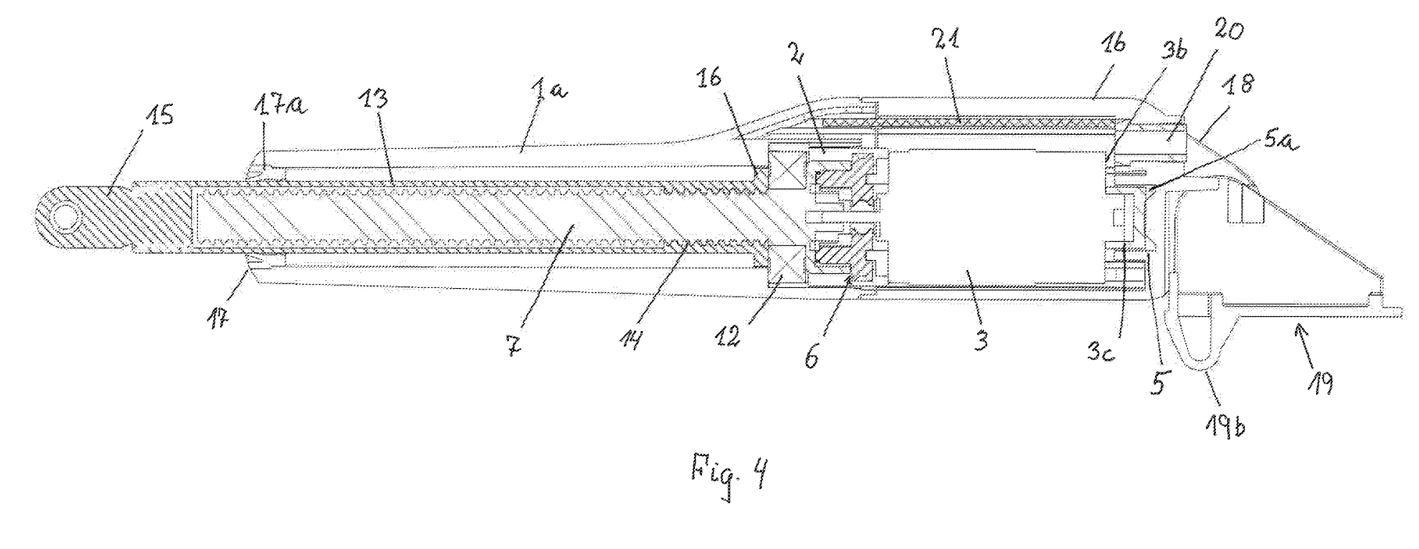
FIG. 4 shows a longitudinal section through the linear actuator of FIG. 1.
Figure 5:
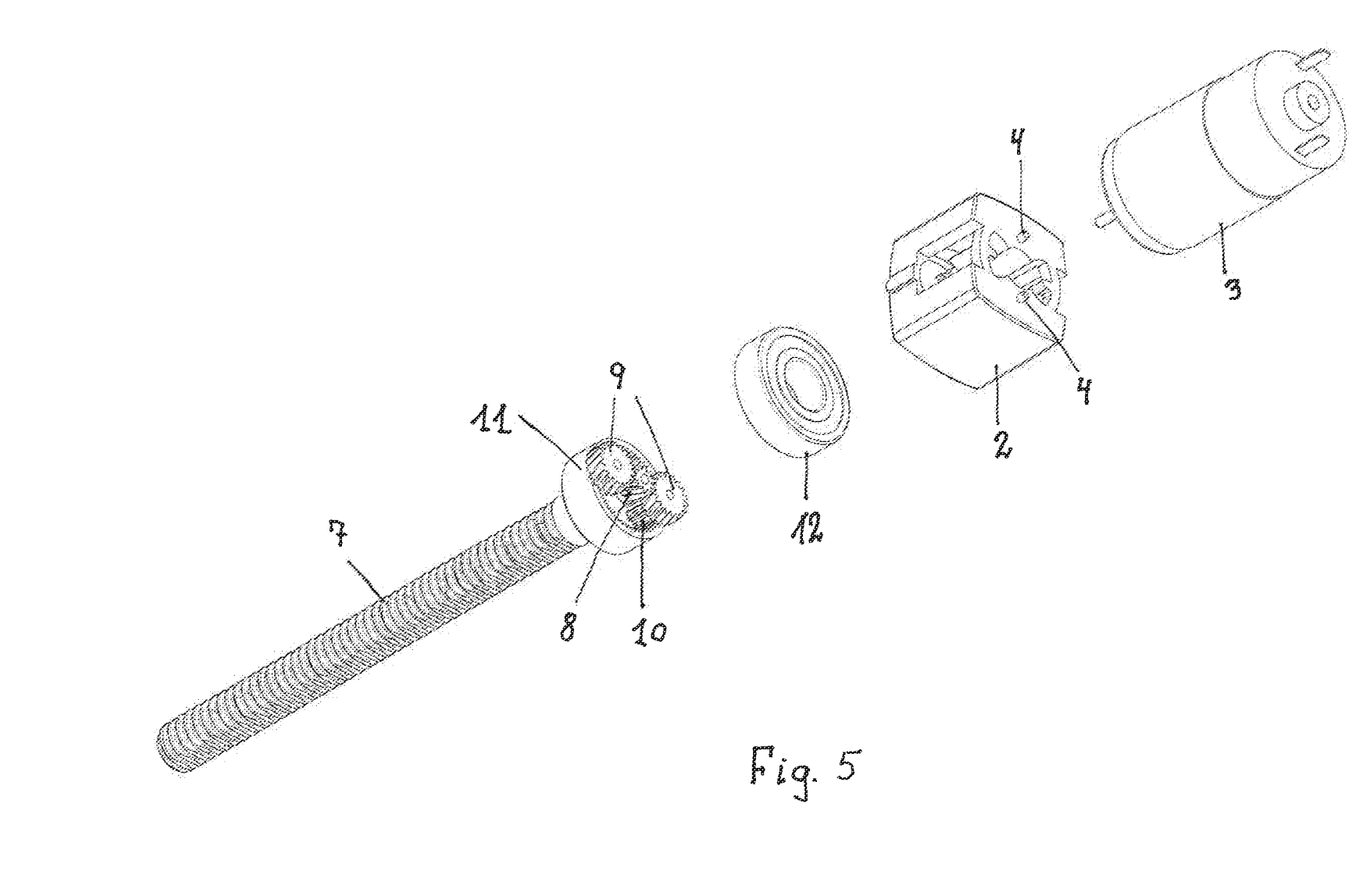
FIG. 5 shows an exploded view of the drive unit of the linear actuator.
Figure 6:
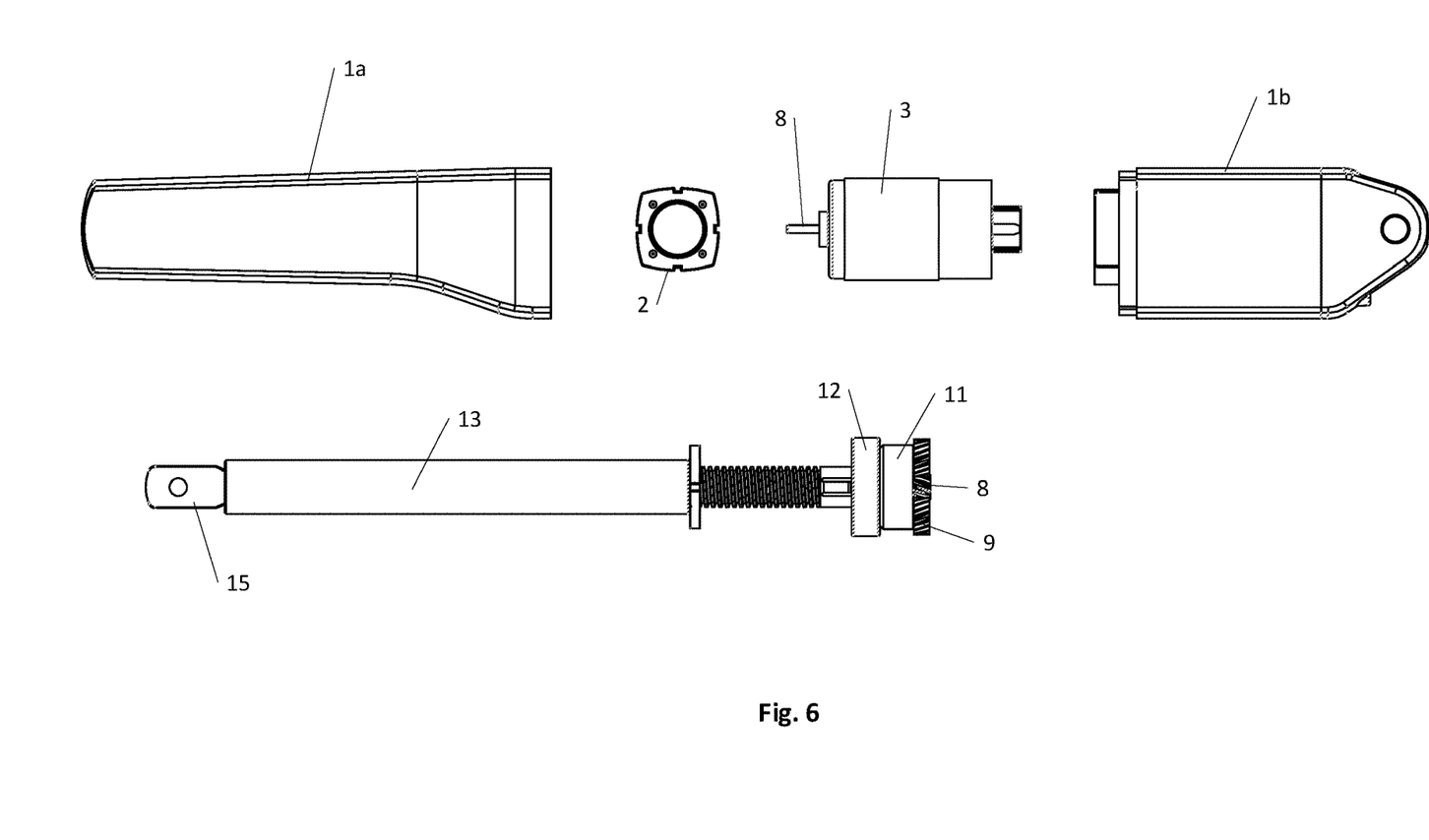
FIG. 6 shows an exploded view of the linear actuator of FIG. 1.
Figure 7:
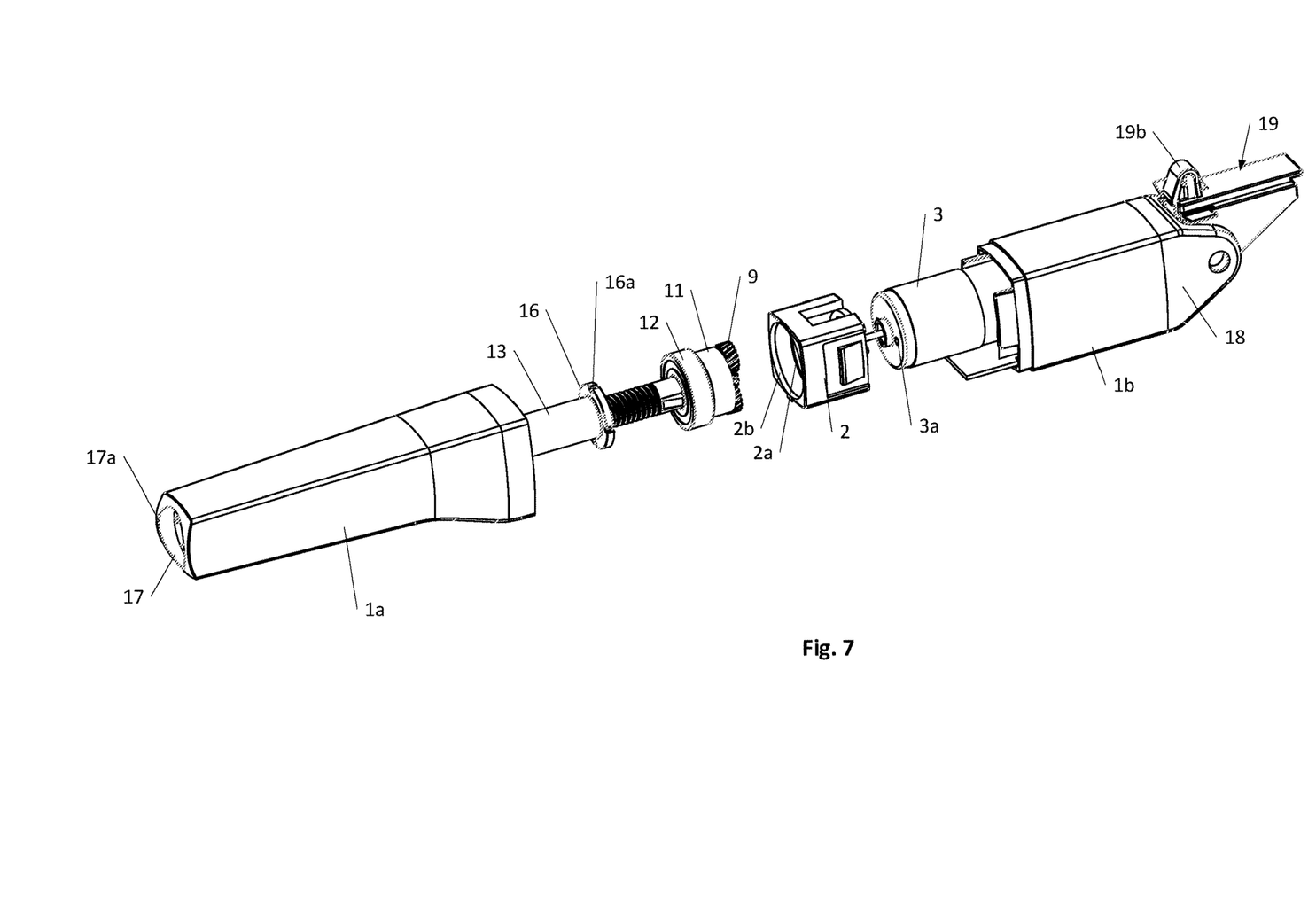
FIG. 7 shows a further exploded view of the linear actuator of FIG. 1.
Figure 8:
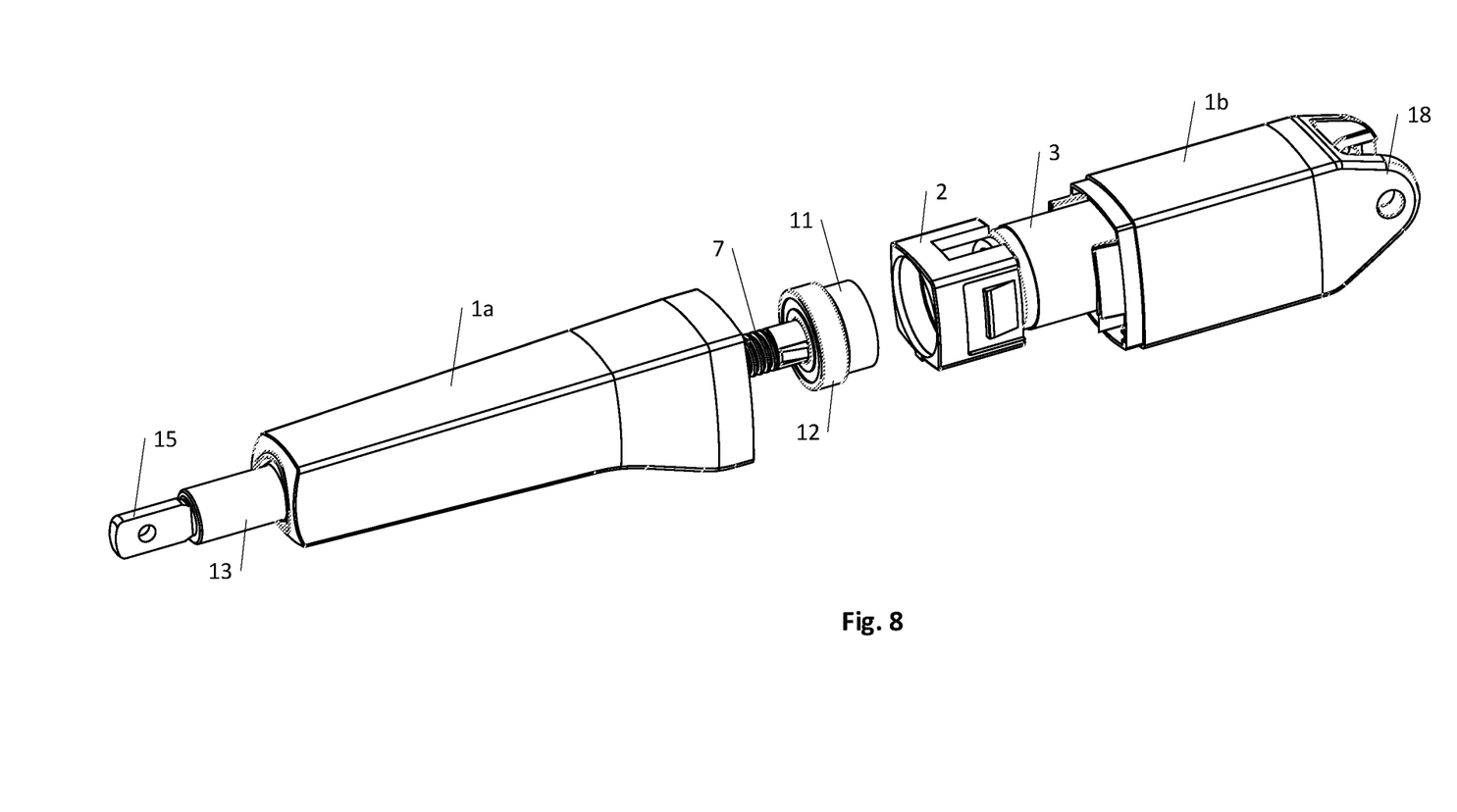
FIG. 8 shows yet another exploded view of the linear actuator of FIG. 1.

The front mounting 15 is in FIGS. 1-4 and 6 shown as an eye, while it is shown as a fork mounting in FIG. 8. In both cases, there is a transverse hole 15a for a pin, bolt, shaft, locking ring or the like for fixation of the front mounting 15.

A rear mounting 18 in the form of a fork mounting is constructed as an integrated part of the rear half 1b of the housing as the side walls as two flanges are guided past the end wall in the housing 1, and in the two elongated side walls there is a transverse hole for a pin, bolt, shaft, locking ring or the like for fixation of the rear mounting. In an embodiment, the rear mounting 18 is constructed with a special bracket 19 for securing the actuator on a rib. The bracket 19 is triangular with two side walls, on which there are axle pins for securing the bracket. When the bracket 19 is inserted in the fork mounting the two axle pins will enter into engagement with the through-going hole therein. In the bracket 19 there is a longitudinal groove by means of which this can be led over the rib. The end of the bracket 19 is equipped with a snap lock with a brace-shaped handle. When operating, pressing the handle, the bracket, and thus the actuator, is released from the mounting rib on the structure in which the actuator is mounted.

In the housing under the motor, a printed circuit board for the motor is inserted. The cable for the printed circuit board extends through a hole 20 in the rear wall of the housing 1. For protecting the cable, there is a protruding flap 1c just below the hole 20, said flap 1c prevents the cable from colliding with the rear mounting 18.

With the invention is thus provided a linear actuator consisting of few components and constructed in a manner making them easy to assemble, by which the manufacturing can be simplified without compromising the quality of the actuators.

The invention claimed is:

1. A linear actuator comprising:
a housing (1) consisting of two parts (1a, 1b),
an electric motor (3) with a motor shaft,
a transmission (8-11) in connection with the motor shaft,
a spindle unit in connection with the transmission, where the spindle unit comprises at least a spindle (7) with a spindle nut (14) and where the spindle (7) is equipped with a bearing (12),
an activation element (13) in connection with the spindle unit, wherein a mounting unit (2) is embedded in the housing (1), said mounting unit (2) has a front end and a rear end, and where the electric motor (3) is placed on the rear end of the mounting unit (2) and the spindle (7) is mounted on the front end of the mounting unit (2), and where the transmission is located inside the mounting unit; and
wherein the rear end of the activation element (13) is equipped with a collar (16), which functions as a stop against the bearing (12) in the fully retracted position of the activation element (13).

2. The linear actuator according to claim 1, wherein the transmission (8-11) is located inside the mounting unit (2).

3. The linear actuator according to claim 1, wherein the housing (1) consists of a front half (1a) and a rear half (1b) with a joining surface perpendicular to the longitudinal axis of the actuator.

4. The linear actuator according to claim 1, the housing (1) has a recess for form-fitting reception of the mounting unit (2).

5. The linear actuator according to claim 1, wherein a recess (2c) is provided in a side of the mounting unit (2), said recess fits over a rib in the rear half (1b) of the housing (1) for additional fixation of the mounting unit (2).

6. The linear actuator according to claim 1, wherein the electric motor (3) is mounted against the rear end of the mounting unit (2) for which purpose the mounting unit is equipped with a number of axially protruding pins (4) fitting into corresponding holes in the front end of the motor.

7. The linear actuator according to claim 1, wherein the rear end of the rear half (1b) of the housing (1) is equipped with a seat (5) for embedding the rear end (3a) of the electric motor.

8. The linear actuator according to claim 1, wherein the transmission comprises a planetary gear (6) with a sun wheel (8), driven by the motor (3) and a ring wheel (11) mounted on the rear end, the shaft of the spindle (7).

9. The linear actuator according to claim 1, wherein the rear end of the spindle (7) in front of the ring wheel (11) is equipped with a ball bearing (12) mounted in a recess (2b) intended for that purpose in the front side of the mounting unit (2) in front of the recess (2a) for the planetary gear (6).

10. The linear actuator according to claim 1, wherein at least the rear part of the activation element (13) which protrudes over the spindle (7) is tubular and is equipped with internal threads which constitute the spindle nut (14).

11. The linear actuator according to claim 1, wherein the activation element (13) is tubular and that the spindle nut (14) is constructed in the rear part thereof and that the front mounting (15) is constructed in the frontmost free end of the activation element (13).

12. The linear actuator according to claim 1, wherein the activation element (13) is secured against rotation in that the collar (16) is constructed with incisions (16a) in the circumference which grips around axially running ribs inside the housing (1) intended for that purpose.

13. The linear actuator according to claim 1, wherein the activation element (13) with internal threads (spindle nut 14)), collar (16) and front mounting (15) is moulded in plastic as one single unit.

14. The linear actuator according to claim 1, wherein a rear mounting (18) is a fork mounting constructed as an integrated part of the rear half (1*b*) of the housing (1) as the side walls as two flanges (18*a*, 18*b*) are guided past the end wall in the housing (1) as the side walls as two flanges (18*a*, 18*b*) are guided past the end wall in the housing (1), and in the two elongated side walls there is a transverse hole (18*c*) for a pin, bolt, shaft, locking ring or the like for fixation of the rear mounting.

15. The linear actuator according to claim 1, wherein a bracket (19) is mounted in a rear mounting (18) for securing the actuator on a rib, said bracket is triangular with two side walls, upon which there are axle pins (4) for securing the bracket (19) in the rear mounting as the two axle pins (4) are in engagement with a through-going hole (18*c*) therein, and that the bracket is provided with a longitudinal groove (19*a*) by means of which it can be led over the rib, and that the end of the bracket is equipped with a snap lock (19*b*) with a brace-shaped handle for releasing the bracket and thereby the actuator from the mounting rib on the structure in which the actuator is mounted.

16. The linear actuator according to claim 1, wherein a printed circuit board (21) for the electric motor is inserted in the housing under the electric motor (3), and that a cable for the printed circuit board extends through a hole in the rear wall of the housing (1).

* * * * *